United States Patent [19]
Andersen et al.

[11] 3,738,669
[45] June 12, 1973

[54] HALF SEAL UNITS

[75] Inventors: Kare Andersen, Elgin; Kenneth F. Gabrys, Steamwood; Tyrone B. Ingo, Glen Ellyn, all of Ill.

[73] Assignee: Chicago Rawhide Manufacturing Company, Chicago, Ill.

[22] Filed: Apr. 26, 1971

[21] Appl. No.: 137,156

[52] U.S. Cl. .............................. 277/199, 277/178
[51] Int. Cl. ........................................ F16j 15/32
[58] Field of Search ................... 277/192, 58, 178, 277/199, 216, 220, 222

[56] References Cited
UNITED STATES PATENTS

| 3,027,167 | 3/1962 | Leibig | 277/171 |
|---|---|---|---|
| 2,729,482 | 1/1956 | Kosatka | 277/178 |

*Primary Examiner*—Samuel B. Rothberg
*Assistant Examiner*—Robert I. Smith
*Attorney*—James T. Fitzgibbon

[57] ABSTRACT

A segmented seal such as a half seal or other component of a so-called split seal. The individual segments are intended for subsequent assembly with other similar segments to form a complete annular seal having a so-called split line formed between the two segments where end faces thereof meet in opposed relation. Each end face has a configuration designed to provide a fluid tight connection at this so-called split line when two half seals, for example, are assembled and installed in a position of use within an engine or otherwise disposed so as to surround a relatively movable part. The seal at the split line is significantly improved without sacrificing the effectiveness of the primary and secondary seals formed respectively by the primary or wet lip and the radially outwardly directed mounting portion of the seal. Preferably, this is accomplished by a half seal in which each individual end face is comprised of radially outer and radially inner portions joined to each other along a line parallel to the shaft center line, with one end face portion lying in a first plane coincident with a true radial line extending outwardly from the seal center and the other end face portion lying in a plane slightly inclined with respect to the first plane, with the included angle between the two planes being just less than 180°. The two planes preferably meet radially outwardly from the center substantially the same distance therefrom as does the outwardly facing part of the seal which will form the secondary seal. Prior to installation the portions of the end faces adjacent the lip lie short of an ultimate intended radial plane of contact between adjacent seal segment faces.

17 Claims, 4 Drawing Figures

PATENTED JUN 12 1973  3,738,669
FIG. 1
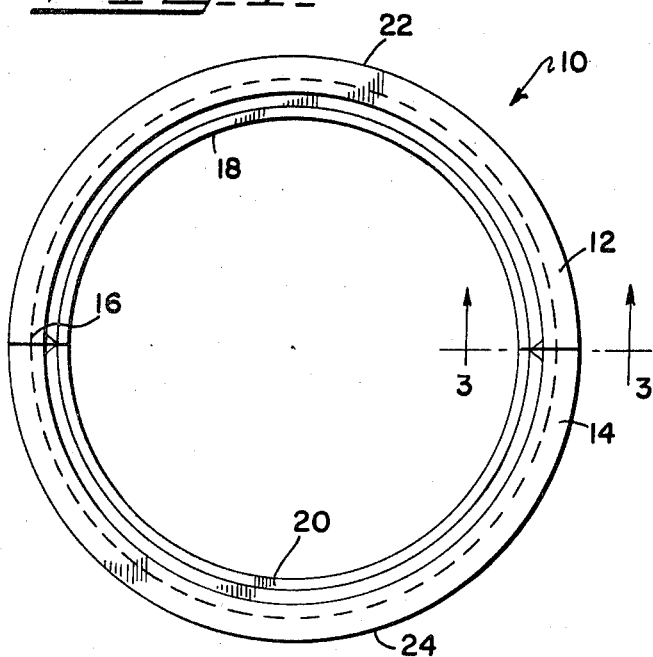
FIG. 2
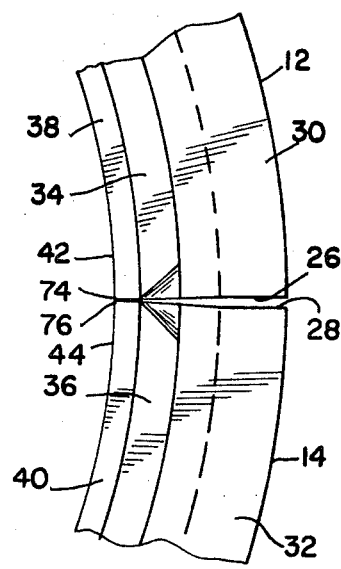
FIG. 3
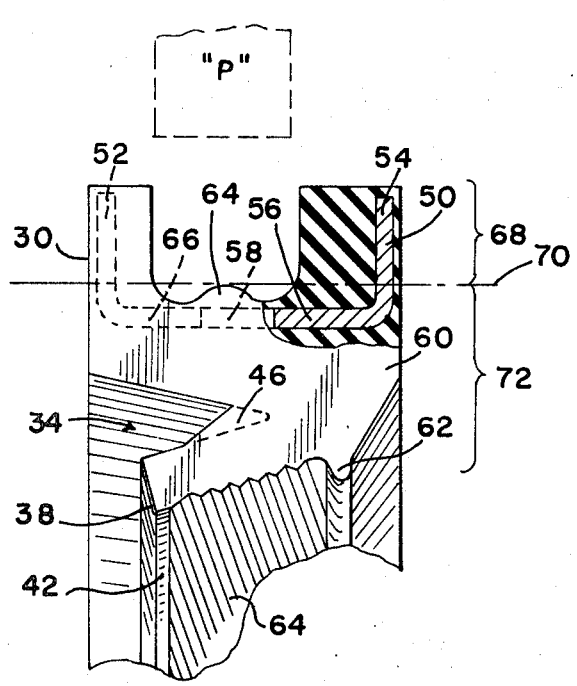
FIG. 4
INVENTORS
KARE ANDERSEN
KENNETH F. GABRYS
TYRONE B. INGO
BY Dreist, Lockwood, Greenawalt & Dewey
ATT'YS

HALF SEAL UNITS

BACKGROUND OF THE INVENTION

The present invention relates generall to fluid seals, and more particularly, to so-called split seals which comprise two or more segments having abutting end faces. Such split seals are also often referred to, and will be herein referred to, as half seals, since a half seal is a common form of segmented or split seal. Half seals are used in those installations wherein there is no free access to a portion of a shaft to be sealed from an axial direction, it is necessary that a radially acting shaft seal be assembled as it is placed in its position of use rather than prior thereto. An example of the use of such seals is in automobile and truck rear crank shaft seals wherein an integral mounting flange or "button" is provided on the rear end of the crank shaft behind the rear main bearing surface of the crankshaft. Seal units of this type are customarily installed after the crankshaft is mounted in its installed position of use, with the rear main bearing surface of the crankshaft held in place by so-called insert bearings supported from the bottom by a bearing cap. Since the area behind the rear main bearing and forwardly of the flange of the crankshaft which receives the flywheel is the area to be sealed, in order to prevent motor oil from leaking from the engine onto the ground or into the area of the bell housing, one half seal is disposed between a portion of the engine block and the crankshaft, and the other half seal is received between the crankshaft and a seal retainer, a portion of the oil pan, or the like. The two end faces on each half seal abut each other along a plane which is commonly referred to as a "split line" in the trade and which lies parallel to the rotational axis of the crankshaft. Although the seal units of the type with which the invention is generally concerned are relatively inexpensive per se, they must be capable of consistent sealing, for several reasons.

Modern engines are customarily operated through extreme speed ranges, and main bearing diameters of crankshafts are commonly considerably larger today than were such diameters even a few years ago. Furthermore, modern short stroke engines are more compact and run cooler than their earlier counterparts, and accordingly, commonly accomodate only half as much oil, for example, as did engines of smaller displacement some years ago.

In addition to the foregoing considerations, manufacturers are now concerned with extended time intervals between oil changes and are also concerned about extended life engine warranties. Furthermore, the design of present day automobiles is such that the rear crankshaft seal, by way of example, is extremely inaccessible, commonly requiring removal of the transmission, lifting of the engine, and other relatively drastic steps to be taken before the oil pan can be removed to gain access to the seal. Accordingly, leakage in an oil seal which may cost only a dollar or more may occasion a repair necessitating the expenditure of a great deal of expensive labor.

Furthermore, modern motor oils include many additives which preclude the use of certain ordinary rubber materials, and accordingly, manufacture of the seal units is limited to the use of materials which are not always easily able to be controlled. Accordingly, minimum or no oil leakage can be tolerated in new, original equipment.

In view of the manner of their installation, crankshaft seals must afford a seal not only at the inside diameters (i.d.) thereof, but also at or near the outside diameters (o.d.) thereof. Since structural stiffness is necessary, seals of this type ordinarily also use a metal stiffening component, and therefore, a so-called insert molding technique is required. The seal half which is thereby produced, however, must be a part wherein the metal insert is totally surrounded by rubber so that a positive, fluid-tight seal may be formed at the split line where opposed half seal faces meet in an abutting relation, and elsewhere. In addition to the foregoing problems, crankshaft and other half seal units are presented with the problem of insuring that a tight seal is formed at the split line, and that this split line seal extend from the inside diameter of the seal all the way to the outside diameter thereof. In other words, a tight seal at the inside diameter is not satisfactory if obtaining the same occasions buckling or distortion of the seal elsewhere along the split line.

In the past, attempts to develop a good seal at the split line separating the two seal halves have sometimes been made by way of manufacturing non-symmetrical half seals, that is, by making seal units wherein a certain taper or slant was given to the split line surface on an upper half piece, while the lower half was manufactured with a different taper and/or angle. Naturally this solution, even if effective, is not preferred since it calls for making two parts rather than only one.

In view of the foregoing, there has existed for some time in the automotive industry a considerable problem of manufacturing proper half seals for rear crankshaft seal applications and for other applications. None of the solutions heretofore attempted has been free of difficulties and drawbacks, and accordingly, there has been room for improvement in the manufacture of half seal units capable of providing seal performance which is fully the equivalent of conventional or fully formed shaft seals.

In view of the foregoing, an object of the present invention is to provide an improved half seal unit.

Another object is to provide an improved half seal of the insert molded type which is capable of forming a fluid tight seal at the split line between a pair of opposed, complementary half seals.

A further object is to provide such a seal unit wherein the configuration of the portion of the half seal adjacent the split line is of a precisely predetermined configuration so as to provide a snug mating action of the split lines upon installation of the seal.

A still further object is the provision of a half seal for use with another complementary half seal unit wherein each half seal includes a stiffening insert therein and wherein the ends of the insert adjacent the split line area are covered with a thin web of rubber of precisely controlled amount.

Another object is to provide a half seal unit adapted to mate with a mirror image seal half.

Another object is to provide a half seal unit adapted to mate with a complementary half seal unit to produce a full circumference seal characterized by a continuous static lip of substantially circular section and characterized by a snug fluid tight fit along the split line which separates the two half seal units.

Another object is to provide a half seal unit for use with another, complementary half seal unit and wherein the region of the split line and the portions of the sealing lip adjacent thereto are designed to minimize installed stresses imposed by the forces applied to the seal during installation.

A further object is to provide a pair of half seals characterized by minimum transfer of forces acting on the outer portion of the seal during installation to an inner part of the seal and thereby create an improper fit.

The present invention achieves these and other objects, including those inherent therein, by providing a half seal unit including an internal stiffener and an elastomeric sealing body surrounding the stiffener with a pair of end faces on the body which are adapted to be placed in an abutting relationship with similarly formed end faces on one or more cooperating seal segments to form a split line lying in an ultimate radial plane, and with the end faces having one portion thereof arranged generally coplanar with a true radius of the seal and the other portion lying in a plane which is angularly related or inclined with respect to the radial plane, and with the ends or corners of the inclined surface approaching or touching but not extending beyond the ultimate radial plane along which the end faces will meet in the compressed, installed position of the seal segment.

The manner in which the invention achieves these objects and advantages will become more apparent when reference is made to the accompanying detailed description of a preferred embodiment of the invention set forth by way of illustration, and when reference is made to the accompanying drawings, in which like reference numerals indicate corresponding parts throughout.

BRIEF DESCRIPTION OF THE DRAWINGS

FIG. 1 is an elevational view of two half seal units of the invention, shown in their assembled relation and viewed from one axial end thereof;

FIG. 2 is a fragmentary view of the end face split line portions of two of the half seals of FIG. 1, showing the two seal halves in position just prior to assembly thereof;

FIG. 3 is a top plan sectional view, with a portion broken away and on an enlarged scale, taken looking substantially perpendicular to the plane of the split line and taken along lines 3—3 of FIG. 1; and FIG. 4 is a fragmentary perspective view, on a still further enlarged scale, showing the reference planes occupied by respective inner and outer portions of each end face of the half seal of FIGS. 1–3.

DESCRIPTION OF THE PREFERRED EMBODIMENTS OF THE INVENTION

Before referring to the drawings in detail, it will be understood that, whereas the seal units of the present invention may be used in a number of forms and environments, the positions and orientations will be referred to as though the complete seal were installed over the exterior of a shaft lying horizontally and having the exposed or so-called dry side thereof lying to the right as shown in FIG. 3, and accordingly, wherein the plane of the so-called split line is horizontal and parallel to the axial center line of the associated shaft.

It will also be understood that the term seals, as used herein may refer either to a half seal or the completed seal formed of two complementary halves, whichever meaning appears indicated, it being understood that half seal units of the invention are almost always used as one part of a complete seal unit comprised of two identical half seals.

Referring now to the drawings in greater detail, a complete seal assembly 10 is shown to include upper and lower half seals 12, 14, each of generally semicircular or semi-annular configuration and a separated by a so-called split line 16 which is actually in the form of a generally horizontal plane lying to either side of the imaginary center line of the shaft with which the seal is associated in use. Each half seal 12, 14 includes a primary lip generally designated 18, 20 forming the inner surface thereof, a radially outer peripheral surface 22, 24, and as shown in FIG. 2, a split line surface 26 for the upper seal 12 and a split line surface 28 for the lower seal 14. This view also shows that, when seen from the axially inner or wet (oil) side, each half seal unit 12, 14 presents a radially extending axially directed front surface 30, 32, that a groove 34, 36 lies inwardly thereof, and that a generally radially extending, frusto-conical or inclined inner surface 38, 40 on each seal half 12, 14 terminates at its inner edge 42, 44 to form the so-called static lip portion of the primary lip 18, 20. At either end of the groove 34, 36, a fillet 46, 48 is provided for reasons which will be referred to elsewhere herein.

FIG. 3 shows that a steel or other relatively stiff insert 50 is provided and that this insert is of generally U-shaped configuration and includes a pair of legs 52, 54 with an axially extending bight portion 56 through which a plurality of openings 58 extend. In addition to the above described elements, the seal body 60 also includes a secondary or dust lip 62, a plurality of helical ribs 64 lying between the primary lip 42 and the secondary lip 62 and a secondary sealing bead 64. Inasmuch as the insert 50 is totally or almost totally surrounded by rubber, the body 60 ordinarily has a very thin web or film 66 overlying the end faces of the insert 50. With this in mind, the necessity of the openings 58 is apparent. In other words, when the fluent material is forced into the mold cavity, as in injection, transfer, or compression molding, provision must be made to permit rapid flow into the parts of the seal body 60 which lie radially inwardly of the stiffener 50 as well as the parts lying radially outwardly thereof. Thus, it will be understood that there are a plurality of openings 58 spaced about the entire length of the stiffener 50 and that flow of elastomer prior to curing thereof is permitted in this manner.

By reference to FIG. 3, it will also be seen that the spaced apart openings 58 may also permit slight "give" of the elastomer in this area when the secondary sealing bead 64 engages a part "P" (shown in phantom lines in FIG. 3) of the engine block or seal retainer with which it will be associated, so that a radial compressive load applied thereto may be relieved by slight inward movement of rubber through the apertures 58 rather than by a force applied to the stiffener 50 which would cause distortion thereof.

Referring now to FIG. 4, the preferred construction of the end face or split line surface portions of the half seals of the invention is illustrated. In particular, FIG. 4 shows that a flat, planar surface 68 forms one end surface of a half seal unit 12, and that at a point or line of inflection 70, the plane 68 merges into or intersects a second plane 72 which is very slightly inclined with respect to the first plane 68. As shown in the drawing, measured between outwardly facing surfaces, the two planes 68, 72 are separated by an included angle of just less than 180°, preferably about 178 ½°, and normally no less than 175°. Since the complementary seal half 14 is formed in a similar manner, it may be seen by reference to FIG. 2 that just prior to complete assembly of the two half seals 12, 14 the inner corners 74, 76 of each half seal will become tangent along or very close to a so-called ultimate radial plane, that is, coplanar with the plane at which the installed seal halves or segments will meet with their end faces abutting. Upon final installation of the seal halves or segments 12, 14, the entire seal body will be somewhat compressed, although the primary lip will be enlarged circumferentially as it fits over its associated shaft. With the 178.5° included angle referred to, in a moderate diameter seal, each of these corners 74, 76 is then offset anywhere from about 0.001 up to about 0.004 or 0.006 inches from the position it would occupy if the end face portion of which it forms a part lay in a true radial plane. In one preferred construction, the point or line of inflection 70, illustrated by the broken line in FIG. 3, is formed at the virtual point of intersection between the end face 26 or 28 and the secondary sealing bead 64, that is, the line of inflection lies radially outwardly of the imaginary shaft center line to an extent equal to the radial extent of the secondary seal bead 64. In the prior art, entirely different approaches have been taken to the problem of split line sealing, and in particular, constructions were made wherein the corners of partial seals extended well beyond the plane of ultimate abutment. These seals were often characterized by puckering and leakage remote from the seal lips.

In contrast to the prior art, however, the half seal construction of the present invention enables reliable complementary half seals to be made, which upon formation into single, radially acting annular seal units in use, provide seals which are virtually completely free of radial mismatch, which show no puckering at any place along the split line, and which provide excellent sealing performance in use. Although puckering may occur anywhere along the abutment line, puckering is most common along surfaces which lie generally axially of the shaft.

Prior art attempts to produce high quality segmented seals have included manufacturing seal halves in pairs wherein the upper and lower seal units are different from each other, that is, the end faces of one seal have a certain angular inclination from a true radial line, while the complementary face is characterized by a different angle of inclination. Other attempts have also proved unsuccessful, and although the reasons therefor are not understood with certainty, it is thought possible that such attempts were based on a belief that allowance for compressive deformation should be made only in the purely elastomeric or unsupported portion of the seal body. As pointed out, one important feature of the invention appears to be the provision of an end face having two planes, with one radially plane thereof lying on a true radius from the center of the seal half and the other plane being inclined with respect to the first plane and arranged such that its radially innermost edges or corners lie on or close to the plane of ultimate installed end face abutment (line 3—3 of FIG. 1, for example).

In the preferred construction illustrated, the line or point of inflection 70 lies radially just outside of the bight portion 66 of the insert 50 and substantially coincident with the outer diameter of the secondary seal bead or surface 64. Accordingly, it appears that the advantages of the invention are not able to be accounted for solely by placing the inflection line along a transition area or between relatively more or less stiff areas of the seal body, since the preferred location of this line of inflection lies well within the stiffest portion of the seal body.

In this connection, however, although the reasons for the success of the present invention may not be fully understood, and whereas the invention is not intended to be limited to any one theory or mechanism of operation, it is believed possible that the installation of the half seals involves not only the abutment of the respective end face portions, and perhaps compression thereof but also slight radial expansion of the primary lip area of the seal. The reaction to this expanded dimension, however, is manifested not merely in the areas most closely adjacent the shaft, including the areas where the sealing lip is unsupported, but is also believed to be manifested in other areas of the end faces, thus, it is believed that an improper configuration of the seal ends manifests itself in puckering and other conditions of improper fit even in areas spaced apart from the sealing lip area. In the case of other segmented seal designs, such as half seals or the like having the primary sealing lips thereof directed radially outwardly rather than radially inwardly, similar considerations of design are present, except that allowance must be made for the fact that the direction of sealing lip distortion is radially inward rather than radially outward, and that the circumferential extent of the seal band is therefore diminished rather than increased. Nevertheless, the application of the principles of the invention relating to formation of the end faces in the manner set forth above is equally applicable to radially outwardly acting seals.

Referring again to the drawings, another feature of the preferred construction is the provision of the fillets 46, 48 adjacent the end faces. Although these fillets 46, 48 may add some stiffness to the seal body 60 in the area radially inwardly of the grooves 34, 36, the fillets 46, 48 do not in and of themselves provide the improved performance brough about by the invention.

In certain cases, studies have been able to be made of prior art seals of the same general type as those with which the present invention is concerned, in order to determine the cause of the so-called puckering which commonly causes an oil leakage intermediate the secondary seal and the primary sealing area. In some of these prior art constructions, it has been noted that there is a definite crease or the like at the junction or point of inflection between planes of each end face. When these opposed end faces are moved into abutting relation, it is common for the oppositely disposed lines of inflection to move apart from each other just as or after the outer edges or corners thereof are moved into engagement. Thus, the line acts as a permanent crease or the like within a flexible body, and upon applying an abutting compressive force, the areas of the crease in the unsupported seal body tend to be moved away from each other, with the result that opening is still present to permit oil leakage. In certain constructions according to the present invention, this line of inflection 70, which presents a potential point of leakage, can be eliminated in the actual assembled position of the seal, since the line of inflection is disposed well within the stiffened body generally on or very closely spaced from the point at which the stiffening member is disposed in the body. Thus, since the rubber adheres strongly to the stiffener, the entire stiffened body portion is able to absorb enough force to compress these two opposed areas into a truly flat position to eliminate leakage therebetween. On the other hand, if this line lay radially spaced apart from the stiffening member, such as within the lip area only, any force tending to move the interfering portions of the opposite end faces together would be only serve to move the inflection line areas apart.

Thus, although the invention is not to be taken as limited to any particular theory or mode of operation, it is known that the invention described and claimed herein provides improved half seal and like segmented seal units having a number of advantages and characteristics, including those pointed out herein and others which are inherent in the invention.

Since certain changes and modifications to the preferred form of construction shown may occur to those skilled in the art, it is anticipated that such changes may be made without departing from the spirit of the invention or the scope of the appended claims.

We claim:

1. A half seal unit for association with a shaft or the like, said unit being adapted for concentric disposition with respect to an imaginary axial center line of an associated shaft to be sealed, said seal having an elastomeric seal body portion terminating in a pair of circumferentially spaced apart end face portions and including at least one radially inwardly directed sealing lip portion lying a given radial distance from said center line, and at least one radially outwardly directed, outer surface portion lying radially outwardly of said sealing lip, said end face portions each comprising a radially outer end face portion and a radially inner end face portion joined to each other along a line generally parallel to said center line, with said outer end face portion lying in a first plane coincident with a true radial plane extending outwardly from said center line and said inner end face portion lying in a plane slightly inclined with respect to the first plane, said planes having therebetween an included angle of just less than 180°.

2. A half seal unit as defined in claim 1 wherein said included angle is substantially 178.5°.

3. A half seal unit as defined in claim 1 wherein said included angle is not substantially less than 175°.

4. A half seal unit as defined in claim 1 in which said at least one outer surface portion comprises a pair of axially spaced apart, partially cylindrical surfaces, wherein a reduced diameter outwardly facing rib forms a part of said body and lies between said surfaces, and wherein said line along which said inner and outer portions of said end faces are joined lies outwardly of said center line a distance substantially equal to the distance from said center line to the radially outermost portion of said rib.

5. A half seal unit as defined in claim 1 wherein a metal stiffener unit is disposed within said seal body, said stiffener being substantially entirely surrounded by said elastomeric body portion.

6. A half seal unit as defined in claim 1 wherein said stiffener is in the form of a generally U-shaped channel with the leg portions thereof extending radially outwardly in axially spaced apart relation.

7. A half seal unit as defined in claim 1, which further includes means forming a part of said body portion for cooperation with an associated part to form a secondary seal, said means lying radially inwardly of said outer surface and radially outwardly of said sealing lip.

8. A half seal unit as defined in claim 7, wherein said line along which said end face portions are joined is substantially radially coincident with said secondary seal forming means.

9. An annular segmented sealing member for mounting between relatively rotatable parts, each segment of said sealing member including opposite end face surfaces adapted for circumferential compressive abutment with end face surfaces of adjacent segments to place the abutting end face surfaces in an ultimate common radial plane in the mounted condition of said sealing member, each end face surface in its relaxed, non-compressed condition comprising radially and angularly related surface portions with said angularly related surface portion at least approaching but not substantially extending beyond said ultimate common radial plane, said radially related surface portion lying at least substantially in a plane short of said ultimate common radial plane.

10. A segmented sealing member as defined in claim 9 wherein said surface portions of said end face meet along a line which is substantially radially coincident with means on said sealing member adapted to engage an associated machine member to form a secondary seal.

11. A sealing member as defined in claim 9 which further includes a stiffening member disposed within and substantially surrounded by the other portions of said sealing member.

12. A sealing member as defined in claim 11 wherein said stiffener is in the form of a generally U-shaped channel with the leg portions thereof extending radially outwardly in axially spaced apart relation.

13. A sealing member as defined in claim 9 wherein said radially and angularly related surface portions, in their relaxed, non-compressed conditions, lie in planes having an angle therebetween, measured exteriorly of the seal body, of about 178.5°.

14. A sealing member as defined in claim 9 wherein the primary sealing lip portion thereof is directed radially inwardly of said member.

15. A seal segment unit for association with a shaft or the like, said unit being adapted for concentric disposition with respect to an imaginary axial center line of an associated shaft to be sealed, said seal having an elastomeric seal body portion terminating in a pair of circumferentially spaced apart end faces lying between radially inner and outer portions of said body and including at least one radially directed sealing lip portion, said end faces each comprising at least two portions with one portion lying in a radial plane extending outwardly from said center line and the other portion lying in a plane which is slightly inclined with respect to said radial plane, said planes having therebetween an included angle, measured exteriorly of said seal body, of just less than 180°.

16. A seal unit as defined in claim 15 wherein means are provided for greatly increasing the stiffness of said seal body along a line at which said two portions of said end faces meet and at which said angle is measured.

17. A seal unit as defined in claim 16 wherein said means is in the form of a metal stiffener.

* * * * *